UNITED STATES PATENT OFFICE.

JOSEPH WELLER, OF TREXLERTOWN, PENNSYLVANIA.

MEDICAL COMPOUND.

SPECIFICATION forming part of Letters Patent No. 311,930, dated February 10, 1885.

Application filed August 15, 1884. (No specimens.)

*To all whom it may concern:*

Be it known that I, JOSEPH WELLER, a citizen of the United States, residing at Trexlertown, in the county of Lehigh and State of Pennsylvania, have invented or discovered a new and useful composition or compound of herbs, fruits, and medicines for the relief of functional derangements of the liver and the glandular system of the alimentary canal—such as piles, costiveness, dropsy, diarrhea, kidney disease, and all kindred affections which are the result of bile-poisoned blood, as well as the diseases of the genito-urinary mucous membrane in both sexes—of which the following is a full specification, viz:

My compound consists of doses of twelve (12) grains each, formed into rectangular pulp-like uncoated chewing-pellets, each containing the following ingredients, combined in the manner and proportions stated, to wit: confection of senna, eight ounces; pulverized Tinnevelly senna, forty pennyweights; cream of tartar, (potassii bitartras,) twenty pennyweights; sulphur, (sublimed,) ten pennyweights; crude antimony, two pennyweights; white agaric, ten grains; saffron, (*Crocus orientalis*,) ten grains; distilled oil of white pine, (*Pinus strobus*,) thirty-five drops; uva-ursi tincture, twenty per cent., thirty-five drops; acidum nitricum, (first centesimal dilution,) thirty-five drops; acidum fluoricum, (sixth centesimal dilution,) thirty drops. These ingredients are placed in a suitable receptacle, in the specific proportions named, and mixed, mingled, or compounded by handling, thus rendering the compound of the tenacity of a thick paste or dough. It is then rolled or pressed out into tablets or cakes, and, being made non-adhesive by a sprinkling of pulverized lycopodium, is cut or punched by a die into blocks or pellets of twelve (12) grains each. These pellets are eaten by the person using them as ordinary food is eaten. One pellet, or twelve (12) grains of the compound, constitutes the dose. It in no way harmfully affects the healthy constitution of the person using it.

I am aware that some or all of the ingredients of my compound have been separately used and prescribed as medicines.

I am also aware that some of the ingredients of my compound have been used together with others not used in my compound for medicinal purposes.

I am aware, also, that medical compounds have been made into the rectangular pellets, the form of the dose being only a matter of taste entirely in the province of the compounder; but I am not aware that all the ingredients of my compound have been used together in the manner and specific proportions stated. I do, therefore, not claim, broadly, the discovery of the separate ingredients of my compound, nor do I claim the form and shape of the dose; but What I do claim as my invention or discovery, and desire to secure by Letters Patent of the United States, is—

The herein-described compound of herbs, fruits, and medicines, to be used for medicinal purposes, consisting of confection of senna, pulverized Tinnevelly senna, cream of tartar, sublimed sulphur, crude antimony, white agaric, saffron, (*Crocus orientalis*,) distilled oil of white pine, tincture of uva ursi, nitric acid, and fluoric acid, in the proportions and the doses above more fully and at large set forth.

JOSEPH WELLER.

Witnesses:
EDUARD RUHE,
THOS. W. RUHE.